May 21, 1963 C. C. PIONTKOWSKI 3,090,841
TRANSFORMER CONTROL SWITCH
Filed Nov. 23, 1959 5 Sheets-Sheet 1

INVENTOR.
Clement C. Piontkowski
BY
Barnes, Dickey & Pierce
ATTORNEYS

United States Patent Office 3,090,841
Patented May 21, 1963

3,090,841
TRANSFORMER CONTROL SWITCH
Clement C. Piontkowski, East Detroit, Mich., assignor to The Udylite Corporation, Detroit, Mich., a corporation of Delaware
Filed Nov. 23, 1959, Ser. No. 854,918
9 Claims. (Cl. 200—11)

This invention relates to an electrical switching mechanism and more particularly to a tap selector switch for use in a polyphase variable output transformer.

The principles of the present invention are particularly applicable to a variety of electrical installations wherein polyphase alternating current of a given input voltage is efficiently transformed to a selected output voltage suitable for a specific load application. The ratio of transformation between the input and output voltages is established by the ratio of the number of primary coil windings or turns and the number of secondary coil windings or turns. Transformers may be designed for a fixed ratio of transformation or may be designed to incorporate a number of connections or taps connected to the primary and/or secondary coil windings whereby the effective number of coils can be varied so as to achieve the desired step-up or step-down transformation. A suitable tap selector switching mechanism may be employed in conjunction with a variable output transformer whereby any one of the coil taps may be selectively connected to achieve the desired output voltage.

Tap selector switch mechanisms may be of the rotary type wherein successive taps are connected or energized through 360° rotation of the switching mechanism. The range of output voltages obtainable and the magnitude between each voltage step or increment is determined by the number of coil taps employed in the transformer and the number of coil windings or turns disposed between successive taps. To achieve a broad range of transformation ratios spaced at relatively close steps a large number of transformer taps are required which greatly increases the cost and complexity of the polyphase transformer and attendant circuitry. Moreover, underwriter specifications impose rigid safety restrictions on electrical apparatus whereby tap selector switches incorporating a large number of tap contacts and designed in accordance with the approved code become excessively large and cumbersome and are costly to manufacture. Employment of a plurality of comparatively small tap selector switches interconnected with each other in lieu of one large, cumbersome selector switch does not satisfactorily overcome this problem because of the complex interlocking circuitry required and the same high cost and complexity of the multi-tapped variable polyphase transformer.

The problem has somewhat been alleviated by incorporating separate switching devices along with a tap selector switch and a three-phase variable transformer whereby the wiring connections between transformer coils are interchanged from and to a delta and a Y connection thereby effecting a change in voltage by a factor of $\sqrt{3}$. Although this arrangement doubles the effective number of transformer coil taps the rapid, graduated output voltage regulation is impaired and coordination of the separate switching device with the tap selector switch is difficult. Normally, the aforementioned arrangement requires rotating the tap selector switch through 360°, manually switching the separate switching device from a Y to a delta connection or vice versa and repositioning the tap selector switch to its original position from which it may again be rotated through 360°. In addition, the operation of the separate switching device heretofore employed during the Y to delta switching disconnects the circuit and temporarily interrupts the power output of the transformer which in many installations is undesirable.

Accordingly, the primary object of this invention is to provide a transformer tap selector switch incorporating therein a Y and delta switching device for interchanging the wiring connections between the primary or secondary coil windings from and to a Y and delta connection and which switching is synchronized and operated in conjunction with the tap selector switch so as to achieve a smooth incremental change in output potential without any interruption in the output power thereof.

Another object of this invention is to provide a tap selector switch which may be successively rotated through substantially two revolutions and during which movement the wiring connections between the primary or secondary coil windings are rapidly and automatically switched from a Y to a delta connection and vice versa doubling the effective range of transformation ratio.

Still another object is to provide a transformer tap selector switch which operates in a cascade sequence so that only one phase at a time is disconnected during the Y and delta switching whereby the power output from the transformer is not interrupted and a smooth and rapid transition between the two wiring connections is achieved.

Another object of this invention is to provide a transformer tap selector switch which provides maximum voltage variation with a minimum number of transformer coil taps thereby achieving simplicity and economy in transformer design, manufacture, and in the attendant circuitry.

Still another object of this invention is to provide a transformer tap selector switch of compact design, safe and durable operation, and economical manufacture for simply and rapidly regulating and varying the output voltage of a three-phase transformer.

Other objects and advantages of the present invention will become apparent from the following detailed description taken in conjunction with the accompanying drawings, wherein.

Figure 1:
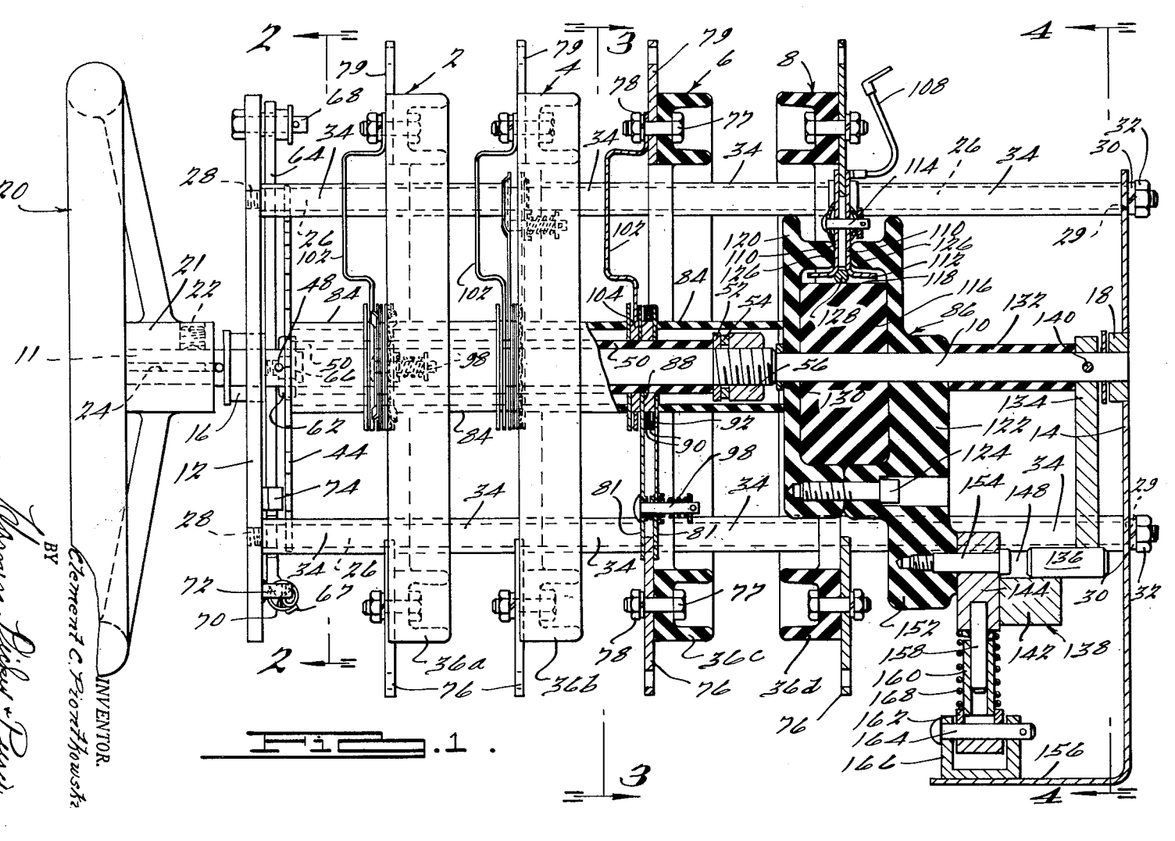
FIGURE 1 is a side elevation view partially in section of a transformer tap selector switch incorporating the preferred embodiments of this invention.

Referring now to the drawings and as may be best seen in FIGURE 1 a tap selector switch incorporating the preferred embodiments of this invention is comprised of three staggered phase switches 2, 4 and 6 and a Y to delta switching mechanism 8 mechanically coordinated together. A central shaft 10 extends longitudinally through substantially the center of the selector switch and has the end portions thereof rotatably journalled in antifriction bearings 16 and 18 rigidly affixed to top plate 12 and base plate 14, respectively. Shank portion 11 of central shaft 10 extends beyond the outer surface of top plate 12 and to which is affixed hand wheel 20 for rotating central shaft 10. The hub portion 21 of hand wheel 20 may be provided with a suitable set screw 22 for axially locking hand wheel 20 to shaft 10. In addition, a suitable keyway longitudinally disposed through the inner surface of the bore through hub 21 and corresponding with a keyway in shank portion 11 of shaft 10 may be provided with a suitable key 24 for rotatably securing hand wheel 20 and shaft 10 together. It will of course be appreciated by those skilled in the art that central shaft 10 may be alternately provided with a suitable gearing arrangement in place of hand wheel 20 whereby rotation of shaft 10 may be achieved by motor means drivingly connected thereto and manually or remotely controlled.

Top plate 12 and base plate 14 are maintained in spaced substantially parallel relationship by means of four tie rods 26 extending therebetween and having one of each of their ends in threaded engagement with threaded bores 28 in top plate 12 and the other end portions thereof extending through apertures 29 in base plate 14 and fastened thereto by lock washers 30 and nuts 32. A series of spacer sleeve sections 34 consisting of a suitable ceramic or resinous insulating material such as, for example, a phenol formaldehyde resin are slidably mounted on tie rods 26 and positioned between the inner surface of top plate 12 and base plate 14. For contact rings 36a through 36d are concentrically disposed around central shaft 10 and are positioned in spaced intervals substantially parallel to top plate 12 and to each other. Contact rings 36a through 36d are of an insulating material similar to that employed for spacer sleeve sections 34 and have a U-shaped cross section comprising two concentric flanges interconnected by a base portion. The base portion of contact rings 36a through 36d are provided with four apertures disposed substantially 90° from each other and through which apertures tie rods 26 extend. Spacer sleeve sections 34 are positioned with the end portions thereof in abutting relationship with the base portions of contact rings 36a through 36d maintaining said rings in appropriate longitudinal spaced relationship.

Figure 2:
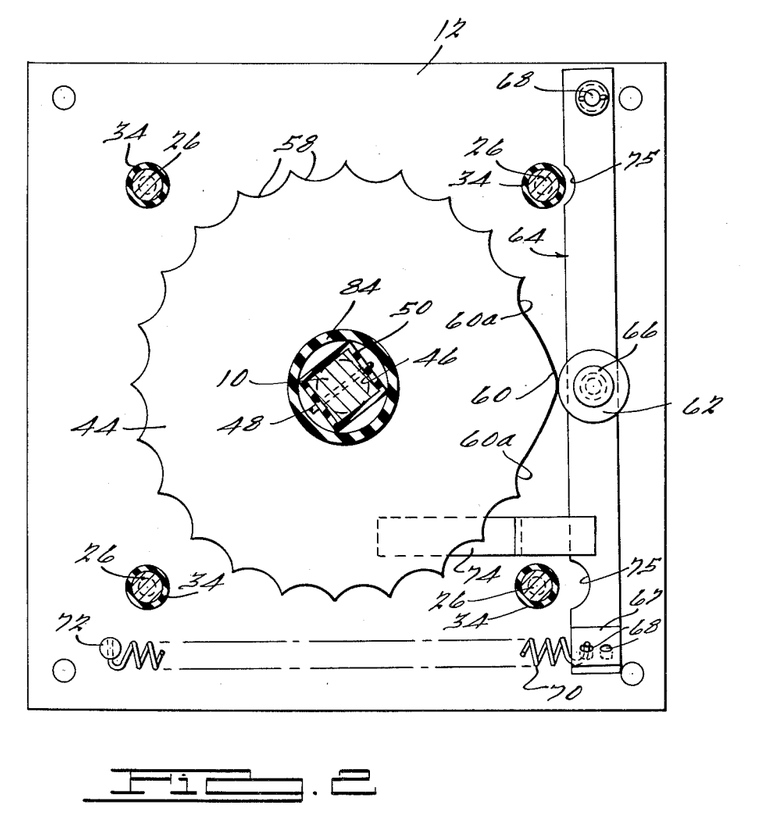
FIGURE 2 is a transverse section view through the selector switch shown in FIGURE 1 and taken along line 2—2 thereof.

The rotation of central shaft 10 is controlled by an indexing mechanism disposed immediately adjacent to the inner surface of top plate 12. As shown in FIGURE 2, the indexing mechanism may be comprised, for example, of a cam and cam follower mechanism including a cam or star wheel 44 having a substantially square aperture 46 in the center thereof which is in slidable engagement with central shaft 10. As will be noted in FIGURE 1 central shaft 10 is provided with a square cross sectional portion extending from the inner surface of top plate 12 a distance slightly beyond contact ring 36c. Star wheel 44 is mounted in appropriate longitudinal relationship with respect to central shaft 10 by means of pin 48 extending through the shaft 10 and having the end portions thereof in abutting relationship with the surface of star wheel 44 adjacent to top plate 12. Star wheel 44 is maintained in abutting relationship with pin 48 by means of square sleeve 50 comprised of a suitable insulating material slidably mounted over the square portion of central shaft 10 and having one end portion thereof in abutting relationship with the side surface of star wheel 44. The other end of square sleeve 50 is in firm abutting relationship with flat washer 52 which is fixedly positioned by means of lock washer 54 and nut 56 in threaded engagement with central shaft 10. The periphery of star wheel 44 as shown in FIGURE 2 is provided with a series of scallops or arcuate cams 58 which in the specific tap selector switch herein described are angularly disposed at substantially 15° intervals. In addition, the periphery of star wheel 44 is provided with hump cam 60 encompassing a total angularity of 45° or equivalent to the combined angularity of three arcuate cams 58. A cam roller or follower 62 is in continuous rolling engagement with the peripheral portion of star wheel 44 and is of a radius corresponding to the curvature of arcuate cams 58. Cam follower 62 is rotatably mounted at substantially the midpoint of lever bar 64 by means of pin 66. One end of lever bar 64 is pivotally secured to top plate 12 by means of pivot pin 68. The other end of lever bar 64 is provided with an angularly depending flange 67 having apertures 68 therein adapted to receive and secure one end portion of tension spring 70. The other end of tension spring 70 is attached to lug 72 fixedly secured to the inner surface of top plate 12. Tension spring 70 continuously biases lever bar 64 and cam follower 62 toward star wheel 44 resiliently indexing central shaft 10 in appropriate angular relationship. In order to rotate central shaft 10 a torque must be applied thereto sufficient to overcome the biasing force of tension spring 70 whereby cam follower 62 is raised over the crests between arcuate cams 58. A Z-shaped retainer strap 74 having one leg portion thereof fixedly secured to the inner surface of top plate 12 and the other leg portion thereof overlying lever bar 64 maintains cam follower 62 in appropriate transverse alignment with the periphery of star wheel 44. As will be noted in FIGURE 2, the inner side portion of lever bar 64 may be recessed at areas 75 to provide adequate side clearance between tie rods 26 and spacer sleeves 34.

Figure 3:
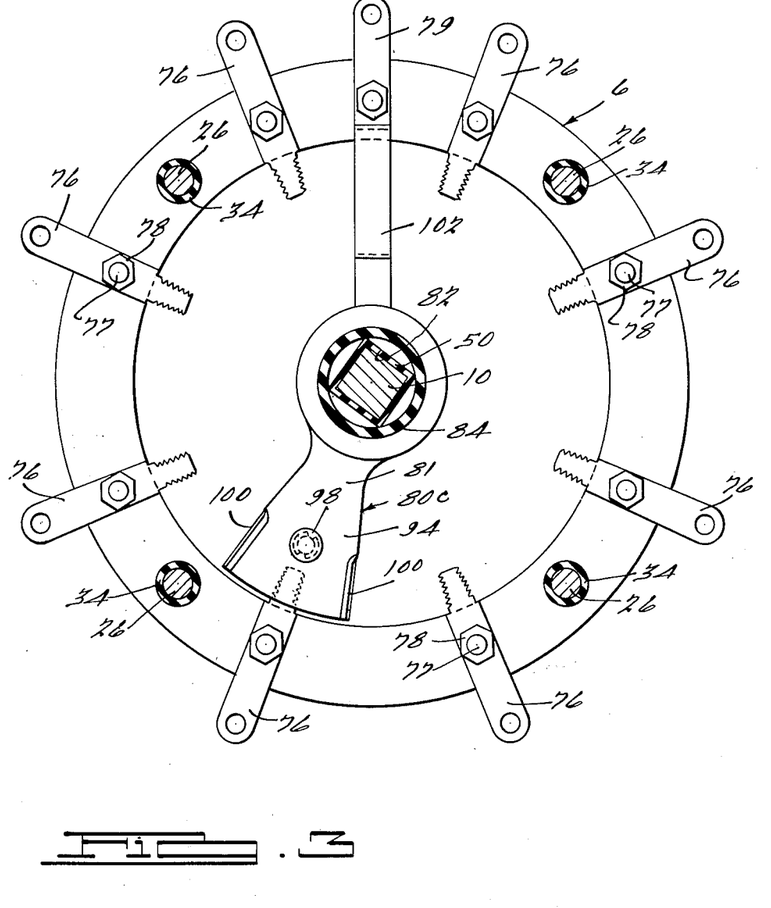
FIGURE 3 is a transverse sectional view of the tap selector switch shown in FIGURE 1 and showing in particular the arrangement of the fixed tap contacts in relationship to the common wiper and taken along the line 3—3 of FIGURE 1.

Phase switches 2, 4 and 6 are operative to selectively connect one of a series of taps in each transformer winding to one phase of the three-phase alternating current whereby the ratio of transformation may be selectively regulated. Phase switches 2, 4 and 6 are essentially identical to each other and unless specifically mentioned, structural aspects of one are equally applicable to the others. As may be best seen in FIGURES 1 and 3, contact rings 36a, 36b, and 36c, comprising portions of phase switches 2, 4 and 6, respectively, are provided with a plurality of fixed tap contacts or knife contacts 76 fixedly secured to the outer surface of the base portions of the contact rings by suitable securing means such as bolts 77 and nuts 78. In the specific tap selector switch herein described, eight knife contacts 76 are radially mounted on each contact ring and circumferentially spaced thereon at substantially 45° intervals corresponding to the angular displacement of three arcuate cams 58. Each contact ring is also provided with one lead contact 79 to which one phase of the three phase alternating current is connected. Movable common contacts or wipers 80a through 80c having square apertures 82 in the center thereof are slidably mounted on square sleeve 50 and longitudinally positioned therealong so as to be in radial alignment with the inward projecting portions of knife contacts 76 and electrically engageable with respective ones of said knife contacts. The appropriate longitudinal spacing of common wipers 80a through 80c is achieved by cylindrical spacer sleeve sections 84 concentrically disposed around shaft 10 and having the end portions thereof in abutting relationship with adjacent common wipers. The end portions of the terminal spacer sleeve sections 84 abut star wheel 44 at one end and the face surface of wiper retainer assembly 86 of the Y and delta switching mechanism at the other end. Each common wiper is comprised of a pair of substantially flat spaced members 81 having a configuration as shown in FIGURE 3 and separated from each other at their connections to the shaft by means of spacer washer 88. A series of annular contact washers 90 and ripple washer 92 of a suitable conducting material such as copper or phosphate bronze are concentrically mounted around spacer washer 88 and with their side surfaces in electrical contact with the spaced members 81 comprising the common wipers. By this arrangement electrical contact between the spaced members 81 is assured. The outward projecting blade portions 94 of spaced members 81 have diverging sides encompassing an angularity of approximately 38° which is designed to provide a slight angular clearance between the sides of the common wipers and the edges of adjacent knife contacts during the middle of the switching movement. The spaced members 81 of each common wiper are biased together by a suitable pin and compression spring assembly 98 as shown in FIGURE 1 which is disposed substantially in the center portion thereof.

Biasing means 98 assure firm sliding contact between the inner surfaces of spaced members 81 and the serrated portions of knife contacts 76. To facilitate engagement of the common wipers with knife contacts 76 as the wiper is rotated the outward projecting side portions of spaced members 81 are provided with oppositely diverging flanges 100 adapted to coact with the inward projecting portion of knife contact 76 so as to spread the spaced members 81 in opposition to the resilient biasing force of resilient means 98. Electrical energy is transmitted from lead contact 79 to each common wiper by means of an offset jumper strap 102 having one end thereof connected to lead contact 79 and the other end thereof in sliding electrical contact around the periphery of spacer 104. Accordingly, electrical energy passes from lead contact 79 through jumper strap 102 to the common wiper and thence to one of the knife contacts 76 in electrical engagement with the outward portion of the common wiper. Each of the knife contacts 76 in turn is electrically connected to a tap in the transformer coil windings.

Common wipers 80a through 80c disposed adjacent contact rings 36a through 36c respectively, are angularly offset 15° from each to provide for staggered switching between adjacent contact rings. Accordingly, for each 15° rotation of central shaft 10 each common wiper moves 15° but only one of the three common wipers switches from one knife contact to the next adjacent knife contact while the other two wipers slide along and maintain electrical contact with the knife contacts adjacent thereto. During the next 15° rotation the second wiper switches from a knife contact to the next adjacent knife contact while the first and third wipers remain in electrical contact with the knife contacts adjacent thereto. Finally, the third wiper switches from a knife contact to the next adjacent knife contact during the succeeding 15° rotation while the first two wipers remain in contact with the knife contacts adjacent thereto. Accordingly, the 15° lead or lag between common wipers provides for a staggered tap switching sequence between the coils of the three-phase transformer. By this arrangement twenty-two voltage regulation steps are obtained by rotating the wipers from the first or through all eight knife contacts. Moreover, only one phase of the three-phase circuit is disconnected at one time so an uninterrupted power output is achieved. After the switch has been rotated through the twenty-two voltage regulation steps the Y and delta switching mechanism is actuated changing the transformer connections to or from a Y and delta connection and during which operation all three common wipers are repositioned on the first knife contact from which the selector switch may again be rotated through another twenty-two voltage regulation steps.

Figure 4:
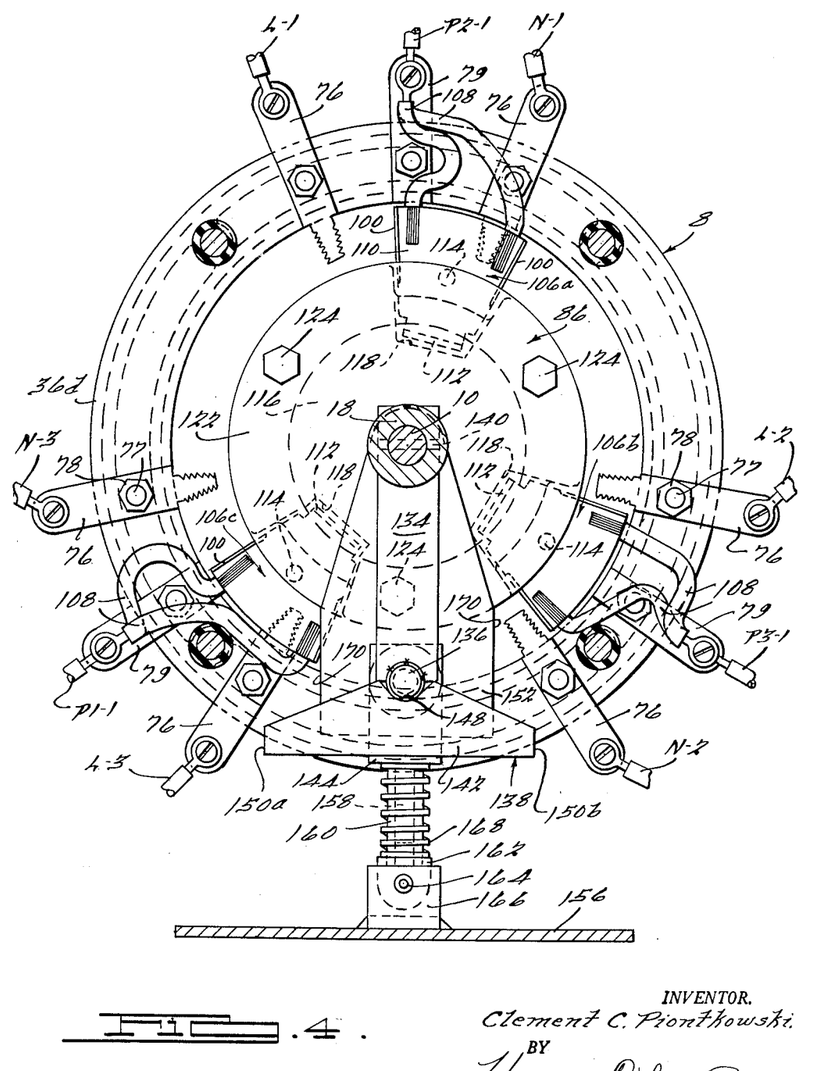
FIGURE 4 is a transverse sectional view through the tap selector switch and showing in particular the Y and delta switching mechanism and taken along line 4—4 of FIGURE 1 and looking in the direction of the arrows.

The Y and delta switching mechanism, as may be best seen in FIGURES 1 and 4, is comprised of a wiper retainer assembly 86 rotatably mounted on the circular portion of central shaft 10 and positioned longitudinally therealong in alignment with contact ring 36d. Contact ring 36d is provided with three pairs of knife contacts 76 similar to those employed in the phase contact rings heretofore described and a lead contact 79 disposed between each pair of knife contacts. Knife contacts 76 of each of the three pairs of contacts are angularly disposed from each other approximately 45° or equivalent to the angular displacement of hump cam 60 on the periphery of star wheel 44. Three movable contacts or wipers 106a through 106c radially extend outwardly from wiper retainer assembly 86 and are adapted to angularly oscillate between alternate knife contacts of each respective pair of knife contacts. Each of the wipers 106a through 106c is electrically connected to lead contact 79 adjacent thereto by means of flexible pigtail conductors 108. Each movable wiper is comprised of a pair of substantially flat spaced members 110 having outwardly diverging side portions of a configuration similar to that of common wipers 80a through 80c heretofore described. The inward portions of each of the spaced wiper members 110 are provided with a flanged end portion 112 disposed at substantially right angles to the blade portion thereof. The outer side edge portions of each of the spaced wiper members 110 are provided with diverging flanges 100 to facilitate engagement and disengagement with knife edge contacts 76 in a manner similar to that of the common wipers of the phase switches. Resilient means 114 are disposed substantially in the center portion of the blade portions of movable wipers 106a through 106c biasing spaced members 110 together so as to assure satisfactory electrical contact with knife contacts 76. Resilient means 114 may be comprised for example of a pin extending through spaced members 110 having arcuate spring sections bearing on the outer portions thereof and retained in compression by a washer secured on the end of the pin by means of a cotter key.

The three wipers 106a through 106c of the Y and delta switching mechanism are maintained in appropriate angular relationship by means of retainer assembly 86. As shown in FIGURES 1 and 4, retainer assembly 86 is comprised of a central cylindrical disk 116 which is provided with three rectangular slots 118 transversely disposed in the periphery of the disk and angularly disposed from each other. Rectangular slots 118 are of a width slightly exceeding the width of the flanged end portions 112 of wipers 106a through 106c. Inner and outer retainer rings 120 and 122, respectively, are disposed in overlying opposing relationship to cylindrical disk 116 and are securely fastened together by means such as screws 124. The annular depending flange portion 126 of inner and outer retainer rings 120 and 122 are recessed along portions thereof radially disposed from rectangular slots 118 in cylindrical disk 116 to enable the movable wipers to extend outwardly therebetween. The coaction between depending annular flanges 126 and the side portions of wiper members 110 and the coaction between the flanged end portions 112 supported on transversely disposed pivot pin 128 in the base of rectangular slot 118 maintains wipers 106 in appropriate radial extending relationship.

As shown in FIGURE 1, wiper retainer assembly 86 is maintained in appropriate longitudinal alignment by washer 130 slidably mounted on shaft 10 and abutting the exterior surface of outer retainer ring 120 and spacer sleeve 132 disposed between the exterior surface of outer retainer ring 122 and actuator arm 134. Movement of wipers 106a through 106c between knife contacts 76 is achieved by the coaction of lobe 136 on the end of actuator arm 134 and resiliently biased switching cam 138. Actuator arm 134 is rigidly affixed to central shaft 10 by lock pin 140. Switching cam 138 is comprised of a triangular block portion 142 affixed to a rectangular base block 144 extending transversely therefrom. Triangular block 142 has two forward sloping side edges and an arcuate cam surface 148. Triangular block 142 is also provided with a pair of substantially straight side edges 150a, 150b which are disposed in substantially parallel spaced relationship. Switching cam 138 is pivotally secured to lug portion 152 of wiper retainer assembly 86 by means of pivot screw 154 extending through rectangular block 144 and having the end portion thereof in threaded engagement with lug 152. Pivot screw 154 is disposed substantially in axial alignment with the center of curvature of arcuate cam surface 148 in triangular block 142. Switching cam 138 is pivotally mounted on depending flange 156 of base plate 14 by means of a resiliently biased slide assembly comprising slide pin 158 fixedly secured to the back portion of rectangular block 144 and slidably mounted within tubular slide guide 160. Tubular slide guide 160 is fixedly secured at its rearward portion to bearing block 162 which is pivotally mounted on pivot pin 164 extending through the depending flanges of U-shaped bracket 166 secured to flange 156. Compression spring 168 overlies tubular slide guide 160 and has one end thereof in abutting relationship with bearing block 162 and the other end in abutting relationship with the rearward portion of rectangular block 144. Compression spring 168 exerts a continuous biasing force against switching cam 138 which in turn maintains wiper retainer assembly 86 in the appropriate Y or delta position and facilitates switching therebetween.

The Y to delta switching mechanism is shown in FIGURES 1 and 4 in a position midway between the Y and delta positions and in which midpoint position actuator arm 134 is in radial alignment with the center line through slide pin 158 and tubular slide guide 160. The corresponding relative position between star wheel 44 and cam follower 62 when the Y and delta switching mechanism is in its mid position is shown in FIGURE 2 wherein cam follower 62 is positioned at the midpoint or apex of hump cam 60. The instant cam follower 62 passes over the apex of hump cam 60 the coaction therebetween causes central shaft 10 to be rotated approximately 22½° to a position wherein cam follower 62 is positioned in either of the end trough portions 60a of hump cam 60 adjacent to arcuate cams 58. Actuator arm 134 is simultaneously caused to rotate through an angular displacement of 22½° whereby compression spring 168 causes the Y to delta switching mechanism to oscillate through the balance of its switching movement. The relationship between switching cam 138 and switching lug 152 of wiper retainer assembly 86 is diagrammatically shown in FIGURE 5 at the completion of the switching movement. The angular oscillation of wiper retainer assembly 86 is controlled by a mechanical stop provided by the contact of one side edge surface 170 of switching lug 152 with the periphery of the adjacent spacer sleeve section 34 around tie rod 26. The total angular displacement of the Y to delta switching mechanism is approximately 45° corresponding to the angular displacement between each pair of knife contacts 76 positioned on contact ring 36d. In the position shown in FIGURE 5 the end surface 150b of switching cam 138 is disposed in the circular path of travel of lobe 136 on the end of actuator arm 134 and provides a mechanical stop restricting further clockwise rotation of central shaft 10. The alternate relative position between lug 152 and switching cam 138 is shown in phantom in FIGURE 5 and wherein end surface 150a of switching cam 138 provides a mechanical stop restricting further counterclockwise rotation of central shaft 10.

Figure 5:
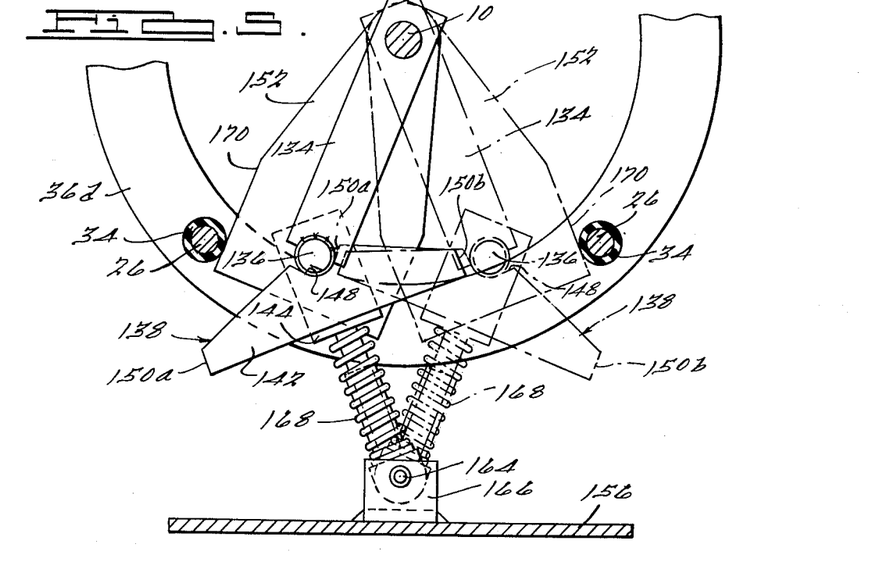
FIGURE 5 is a fragmentary plan view of the Y and delta switching mechanism shown in FIG. 4 and illustrating alternate positions there.

The switching effort exerted by the resiliently biased switching cam 138 may be likened to that of an over-center spring mechanism. For example, let us assume that central shaft 10 is being rotated in a counterclockwise direction whereby lobe 136 on actuator arm 134 approaches arcuate cam surface 148 of switching cam 138. Continued counterclockwise rotation of actuator arm 134 is achieved by overcoming the resistance of compression spring 168 and causing it to be compressed until the midpoint position is reached between the Y and delta position. Further counterclockwise movement of actuator arm 134 beyond the midpoint position is aided by the resilient effort of compression spring 168 which resiliently completes the switching action of the Y to delta switching mechanism. Central shaft 10 may continue to be rotated in a counterclockwise direction until lobe 136 contacts end surface 150a of switching cam 138 preventing further counterclockwise rotation thereof. From that position central shaft 10 may be rotated clockwise approximately 315° at which point lobe 136 again contacts the arcuate cam surface 148 of switching cam 138 and further clockwise rotation causes the Y to delta switching mechanism to reverse to its original position as shown in FIGURE 5. Thereafter central shaft 10 may be rotated in a clockwise direction until lobe 136 comes in contact with end surface 150b of switching cam 138 restricting further clockwise rotation. The total angular rotation between mechanical stops by the arrangement herein described is approximately 675°. This corresponds to two complete revolutions minus the angularity of hump cam 60 on star wheel 44.

As shown in FIGURE 4 wipers 106a through 106c are angularly offset 15° from their respective pairs of contacts so as to provide a staggered or cascade switching sequence between knife contacts 76. By this staggered or cascading switching arrangement only one phase of the three-phase circuit is electrically disconnected at a time while the other two circuits remain energized. Moreover, the cascade switching sequence of the Y and delta switching mechanism is synchronized with the movement of the common wipers whereby each common wiper 80a through 80c disconnects and connects with the next adjacent tap contact simultaneously with the respective switching of movable wipers 106a through 106c. The cascade switching sequence embodied in the Y and delta switching mechanism provides for uninterrupted transformer power output over the entire regulation range of the tap selector switch. It will of course be appreciated by those skilled in the art that a straight throw-over switching sequence may be employed whereby wipers 106a through 106c simultaneously break and make contact with knife contacts 76 in place of the cascading switching mechanism sequence heretofore described. The straight throw-over switching sequence, however, temporarily interrupts the power output of the three-phase transformer which in numerous applications is undesirable.

The cascade switching sequence may be best explained with reference to FIGURE 4. As shown therein, the Y and delta switching mechanism has rotated through substantially one-half of its oscillating switching movement. Let it be assumed that the direction of rotation of central shaft 10 and the Y and delta switching mechanism is in a clockwise direction. During the first half rotation of the Y and delta switching mechanism wiper 106a has rotated out of contact with knife edge contact connected to conductor L–1 and into contact with knife edge contact connected to conductor N–1 followed thereafter by wiper 106b which rotates out of contact with knife edge contact connected to conductor L–2 and approaches knife edge contact connected to conductor N–2. At the same time wiper 106c has rotated relative to but is still in slidable electrical contact with knife edge contact connected to conductor L–3. Further clockwise rotation of central shaft 10 and the Y and delta switching mechanism will achieve electrical contact between wiper 106b and knife contact connected to conductor N–2 which remain in slidable contact for the balance of the switching movement. Immediately thereafter wiper 106c will become electrically disconnected with a knife contact connected to conductor L–3 and will subsequently engage knife contact connected to conductor N–3. During the remaining half of the rotation of the Y and delta switching mechanism wiper 106a remains in slidable electrical contact with knife contact connected to conductor N–1. The cascade switching sequence of the Y and delta switching mechanism operates in reverse sequence during the counterclockwise rotation of central shaft 10. Accordingly, wiper 106c is first to disconnect and connect followed in staggered or cascade sequence by wipers 106b and 106a, respectively. During either the counterclockwise or clockwise oscillation of the Y and delta switching mechanism only the one phase is broken at a time and is re-established before another phase is disconnected. By this manner, as heretofore mentioned, uninterrupted power output is maintained from the three-phase transformer.

Operation of the three-phase tap selector switch through a typical voltage regulation sequence will now be described with reference to the schematic wiring diagram shown in FIGURE 6. A three-phase transformer schematically shown therein is comprised of primary coils P1, P2 and P3 disposed adjacent to secondary coils S1, S2 and S3, respectively, and separated by suitable laminated iron cores 172. Primary coils P1 through P3 are provided with end taps P1–1, P2–1 and P3–1, respectively, which are connected to one of the lead contacts 79 of each pair of contacts mounted on contact ring 36d. In addition, primary coils P1, P2 and P3 are provided with taps P1–2 through P1–9, P2–2 through P2–9, and P3–2 through P3–9, respectively, which in turn are electrically connected to successive knife contacts on contact rings 36a, 36b and 36c. Phase L1, L2 and L3 of the three phase alternating current source are electrically connected to wipers 80a, 80b and 80c, and to one of the knife contacts of each pair of contacts mounted on contact ring 36d. The other of the knife contacts of each pair of contacts on contact ring 36d are connected to neutral conductor 174.

Figure 6:
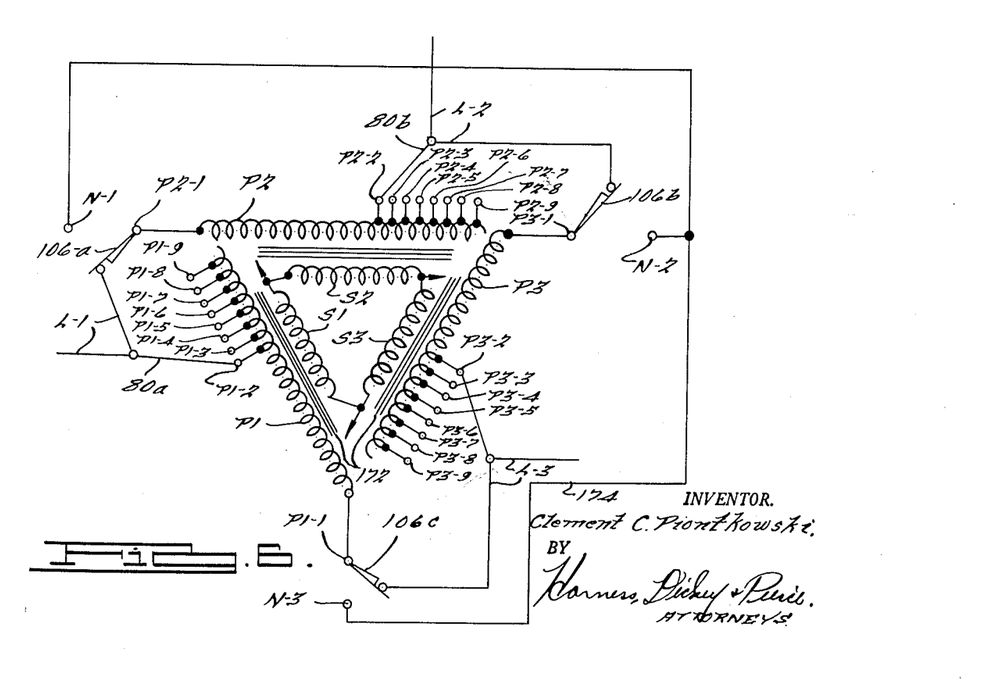
FIGURE 6 is a schematic wiring diagram of a typical three-phase tapped transformer electrically connected to the tap selector switch of this invention.

In the wiring diagram shown in FIGURE 6 the primary coils are delta connected and wipers 80a through 80c are all positioned on the second tap of their respective coil. In this position cam follower 62 is disposed in the trough portion 60a of hump cam 60 on star wheel 44 and the lobe 136 affixed to the end of actuator arm 134 is against the mechanical stop. Moreover, the output voltage of the transformer is at its highest potential. As the tap selector switch is rotated through 15° cam follower 66 moves into the first arcuate cam 58 and wiper 80a moves from tap contact P1–2 to tap contact P1–3 while wipers 80b and 80c remain in slidable electric contact with tap contacts P2–2 and P3–2, respectively. During the next 15° rotation wiper 80b moves from tap contact P2–2 to tap contact P2–3 while wiper 80a remains in contact with tap P1–3 and wiper 80c remains in contact with tap P3–2. The next 15° rotation of the tap selector switch moves wiper 80c from tap contact P3–2 to tap contact P3–3 and all wipers are now on the third tap contact of the respective primary coils. Each 15° rotation causes an incremental decrease in the output voltage of the secondary transformer coil windings. Rotation of the tap selector switch is continued and wipers 80a to 80c move in staggered phase sequence along primary coil taps successively reducing the output voltage of the transformer until all three wipers are positioned on tap 9 of their respective primary coils. In that position cam follower 62 is positioned in the trough portion 60a of hump cam 60 and lobe 136 of actuator arm 134 is in contact with the arcuate cam surface 148 of switching cam 138. Continued rotation of the tap selector switch causes a 45° angular displacement of central shaft 10 during which displacement the Y and delta switching mechanism is actuated. Wipers 106a through 106c successively cascade disconnecting primary coil end taps P2–1, P3–1 and P1–1 from contacts L1, L2 and L3, respectively and electrically connecting them, respectively, to neutral contacts N–1, N–2 and N–3 of neutral conductor 174. The primary windings are now Y connected and an incremental decrease in transformer output voltage has been achieved. Simultaneously with the operation of the Y and delta switching mechanism wipers 80a through 80c are angularly rotated 45° and are all positioned on tap contacts 2 of their respective primary coils. As the tap selector switch is rotated further wipers 80a through 80c move in staggered sequence along tap contacts until all three common wipers are positioned on tap contact 9 of the respective primary coil. In this position, actuator lobe 136 affixed to the end of actuator arm 134 is against the mechanical stop and the output voltage of the transformer is at its lowest potential.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A Y and delta switching mechanism for alternately connecting the windings of a three-phase transformer in Y and delta comprising a framework, a shaft rotatably supported on said framework, an annular contact support ring affixed to said framework and encircling said shaft, three pairs of fixed contacts circumferentially spaced and mounted on said contact support ring each pair comprising a Y contact and a delta contact angularly spaced from each other, a wiper retainer rotatably mounted on said shaft, three wipers secured to said wiper retainer angularly spaced from each other and radially extending from said wiper retainer each in radial alignment with one of said pairs of fixed contacts and alternately engageable with said Y contact and said delta contact of said aligned pair of fixed contacts, a resiliently biased switching cam having one end thereof pivotally mounted on said framework and the other end thereof pivotally secured to said wiper retainer, an actuator arm fixedly secured to and radially extending from said shaft and adapted to coact with said switching cam for oscillating said wipers from engagement with said respective Y contacts to engagement with said respective delta contacts and vice versa in a preselected cascade sequence, means for rotating said shaft and stop means associated with said wipers for restricting the angular oscillation thereof to a displacement substantially equal to the angular displacement between said Y and said delta contacts.

2. In a tap selector switch for controlling the output voltage of a three-phase transformer including three phase switches each comprising a series of fixed tap contacts, a common contact, and means for progressively connecting the common contact with one of said fixed tap contacts of said series of fixed tap contacts, the improvement comprising a Y and delta switching mechanism mechanically connected to the phase switches and operable when all of the common contacts have successively advanced through all of the respective fixed tap contacts of each of the series of fixed tap contacts, said switching mechanism comprising three pairs of fixed contacts each pair comprising a Y contact and a delta contact, three movable contacts each disposed adjacent to one of said pairs of fixed contacts, and alternately connectable with said Y contact and said delta contact of said adjacent pair of fixed contacts, and means for simultaneously moving said movable contacts from connection with said respective Y contacts to connection with said respective delta contacts and vice versa.

3. In a tap selector switch for controlling the output voltage of a three-phase transformer including three phase switches each comprising a series of fixed tap contacts, a common contact, and means for progressively connecting the common contact with one of said fixed tap contacts of said series of fixed tap contacts, the improvement comprising a Y and delta switching mechanism mechanically connected to the phase switches and operable when all of the common contacts have successively advanced through all of the respective fixed tap contacts of each of the series of fixed tap contacts, said switching mechanism comprising three pairs of fixed contacts each pair comprising a Y contact and a delta contact, three movable contacts each disposed adjacent to one of said pairs of fixed contacts, and alternately connectable with said Y contact and said delta contact of said adjacent pair of fixed contacts, and means for moving said movable contacts from connection with said respective Y contacts to connection with said respective delta contacts and vice versa in a preselected time sequence.

4. In a tap selector switch for controlling the output voltage of a three-phase transformer including three phase switches each comprising a series of fixed tap contacts, a common contact, and means for progressively connecting the common contact with one of said fixed tap contacts of said series of fixed tap contacts, the improvement comprising a Y and delta switching mechanism mechanically connected to the phase switches and operable when all of the common contacts have successively advanced through all of the respective fixed tap contacts of each of the series of fixed tap contacts, said switching mechanism comprising a framework, a shaft rotatably supported on said framework, a contact support affixed to said framework and encircling said shaft, three pairs of fixed contacts circumferentially spaced and mounted on said contact support each pair comprising a Y contact and a delta contact angularly spaced from each other, three movable contacts rotatably mounted on and radially extending from said shaft each adjacent to and in radial alignment with one of said pairs of fixed contacts and alternately engageable with said Y contact and said delta contact of said adjacent pair of fixed contacts, moving means associated with said movable contacts for oscillating said movable contacts from engagement with said respective Y contacts to engagement with said respective delta contacts and vice versa in a preselected cascade sequence.

5. In a tap selector switch for controlling the output voltage of a three-phase transformer including three phase switches each comprising a series of fixed tap contacts, a common contact, and means for progressively connecting the common contact with one of said fixed tap contacts of said series of fixed tap contacts, the improvement comprising a Y and delta switching mechanism mechanically connected to the phase switches and operable when all of the common contacts have successively advanced through all of the respective fixed tap contacts of each of said series of fixed tap contacts, said switching mechanism comprising a framework, a shaft rotatably supported on said framework, an annular contact support ring affixed to said framework and encircling said shaft, three pairs of fixed contacts circumferentially spaced and mounted on said contact support ring each pair comprising a Y contact and a delta contact angularly spaced from each other, a wiper retainer rotatably mounted on said shaft, three wipers secured to said wiper retainer angularly spaced from each other and radially extending from said wiper retainer each in radial alignment with one of said pairs of fixed contacts and alternately engageable with said Y contact and said delta contact of said aligned pair of fixed contacts, a resiliently biased switching cam having one end thereof pivotally mounted on said framework and the other end thereof pivotally secured to said wiper retainer, an actuator arm fixedly secured to and radially extending from said shaft and adapted to coact with said switching cam for oscillating said wipers from engagement with said respective Y contacts to engagement with said respective delta contacts and vice versa in a preselected cascade sequence, means for rotating said shaft, and stop means associated with said wipers for restricting the angular oscillation thereof to a displacement substantially equal to the angular displacement between said Y and said delta contacts.

6. A tap selector switch comprising three phase switches each comprising a series of fixed tap contacts, a common contact, and means for progressively connecting said common contact with one of said fixed contacts of said series of fixed tap contacts, a Y and delta switching mechanism mechanically connected to said phase switches and operable when all of said common contacts have successively advanced through all of said fixed tap contacts of said respective series of fixed tap contacts, said Y and delta switching mechanism comprising three pairs of fixed contacts each pair comprising a Y contact and a delta contact, three movable contacts each disposed adjacent to one of said pairs of fixed contacts and alternately connectable with said Y contact and said delta contact of said adjacent pair of fixed contacts, means for simultaneously moving said movable contacts from connection with said respective Y contacts to connection with said respective delta contacts and vice versa, and coordinating means for successively advancing all of said common contacts from the last one to the first one of said fixed tap contacts of each of said respective series of fixed tap contacts and vice versa concurrently with the operation of said Y and delta switching mechanism.

7. A tap selector switch comprising three phase switches each comprising a series of fixed tap contacts, a common contact, and means for progressively connecting said common contact with one of said fixed contacts of said series of fixed tap contacts, a Y and delta switching mechanism mechanically connected to said phase switches and operable when all of said common contacts have successively advanced through all of said fixed tap contacts of said respective series of fixed tap contacts, said Y and delta switching mechanism comprising three pairs of fixed contacts each pair comprising a Y contact and a delta contact, three movable contacts each disposed adjacent to one of said pairs of fixed contacts and alternately connectable with said Y contact and said delta contact of said adjacent pair of fixed contacts, means for moving said movable contacts from connection with said respective Y contacts to connection with said respective delta contacts and vice versa in a preselected time sequence, and coordinating means for successively advancing all of said common contacts from the last one to the first one of said fixed tap contacts of each of said respective series of fixed tap contacts and vice versa concurrently with the operation of said Y and delta switching mechanism.

8. A tap selector switch for controlling the output voltage of a three-phase transformer comprising a framework, a shaft rotatably mounted on said framework, three staggered phase switches longitudinally spaced along said shaft, each of said staggered phase switches comprising a series of fixed tap contacts circumferentially disposed around said shaft and spaced at substantially equal angular intervals, a common wiper mounted on said shaft and radially extending therefrom in radial alignment with said fixed tap contacts so as to progressively connect with one of said fixed tap contacts of said series of fixed tap contacts as said shaft is rotated, said common wipers of said phase switches angularly positioned relative to each other and to said respective series of fixed tap contacts and movable from connection with one of said respective fixed tap contacts to connection with the next adjacent respective fixed tap contact in a preselected staggered sequence as said shaft is rotated, a Y and delta switching mechanism longitudinally spaced from and mechanically connected to said staggered phase switches and operable when all of said common wipers have successively advanced through all of said fixed tap contacts of said respective series of fixed tap contacts, said Y and delta switching mechanism comprising three pairs of fixed contacts circumferentially spaced around said shaft and mounted on said framework, each pair comprising a Y contact and a delta contact angularly spaced from each other, three movable wipers rotatably mounted on and radially extending from said shaft each adjacent to and in radial alignment with one of said pairs of fixed contacts and alternately engageable with said Y contact and said delta contact of said pair of adjacent fixed contacts, moving means associated with said movable wipers for oscillating said movable wipers from engagement with said respective Y contacts to engagement with said respective delta contacts and vice versa in a preselected cascade sequence, means for rotating said shaft, and indexing means associated with said shaft for regulating the angular rotation thereof in a series of increments corresponding substantially to one-third the angular displacement between said fixed tap contacts and one increment substantially equal thereto, said latter increment indexed to correspond with the interval during which the Y and delta switching occurs.

9. A tap selector switch for controlling the output voltage of a three-phase transformer comprising a framework, a shaft rotatably mounted on said framework, three staggered phase switches longitudinally spaced along said shaft, each of said staggered phase switches comprising a tap contact support ring concentrically disposed around said shaft and mounted on said framework, a series of eight fixed tap contacts circumferentially spaced at substantially 45° intervals on said tap contact support ring, a common wiper mounted on said shaft and radially extending therefrom in radial alignment with said series of eight fixed tap contacts so as to progressively connect with one of said fixed contacts as said shaft is rotated, said common wipers of said staggered phase switches angularly positioned relative to each other and to said respective series of eight fixed tap contacts and movable from engagement with one of said respective fixed tap contacts to engagement with the next adjacent respective fixed tap contact in a preselected staggered sequence as said shaft is rotated, a Y and delta switching mechanism longitudinally spaced from and mechanically connected to said staggered phase switches and operable when all of said common wipers have successively advanced through all of said fixed tap contacts of said respective series of fixed tap contacts, said Y and delta switching mechanism comprising an annular support ring affixed to said framework and concentrically disposed around said shaft, three pairs of fixed contacts mounted on said contact support ring each comprising a Y contact and delta contact angularly spaced substantially 45° from each other, a wiper retainer rotatably mounted on said shaft, three movable wipers secured to said wiper retainer angularly spaced from each other and radially extending therefrom in radial alignment with one of said pairs of fixed contacts and alternately engageable with said Y contact and said delta contact of said pair of radially aligned fixed contacts, a resiliently biased switching cam having one end thereof pivotally mounted on said framework and the other end thereof pivotally secured to said wiper retainer, an actuator arm fixedly secured to and radially extending from said shaft adapted to coact with said switching cam for oscillating said movable wipers from engagement with said respective Y contacts to engagement with said respective delta contacts and vice versa in a preselected cascade sequence, stop means associated with said movable wipers to restrict the angular oscillation thereof to substantially 45°, means for rotating said shaft, indexing means associated with said shaft for regulating the angular rotation thereof in a series of 15° increments and one 45° increment, said actuator arm indexed relative to said 45° increment to operate said Y and delta switching mechanism when said shaft is rotated through said 45° increment, said common wipers of said phase switches indexed relative to said 45° increment to successively advance from the last one to the first one of said fixed tap contacts of each of said respective series of fixed tap contacts and vice versa concurrently with the operation of said Y and delta switching mechanism.

References Cited in the file of this patent
UNITED STATES PATENTS

| | | |
|---|---|---|
| 1,905,812 | Dante | Apr. 25, 1933 |
| 2,576,836 | Hilsinger | Nov. 27, 1951 |
| 2,686,236 | Hootum | Aug. 10, 1954 |
| 2,821,580 | Black | Jan. 28, 1958 |
| 2,918,541 | Waite | Dec. 22, 1959 |

FOREIGN PATENTS

| | | |
|---|---|---|
| 474,419 | Germany | Apr. 4, 1929 |